United States Patent
Maetz et al.

(10) Patent No.: US 7,493,024 B2
(45) Date of Patent: Feb. 17, 2009

(54) METHOD OF MANAGING THE RECORDING OF AUDIOVISUAL DOCUMENTS IN A TERMINAL SELECTED AMONG A PLURALITY OF TERMINALS, AND AN ASSOCIATED TERMINAL

(75) Inventors: Yves Maetz, Melesse (FR); Louis Chevallier, La Meziere (FR); Izabela Grasland, Breteil (FR); Franck Hiron, Chateaubourg (FR); Jiang Shao, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 696 days.

(21) Appl. No.: 10/502,838

(22) PCT Filed: Jan. 30, 2003

(86) PCT No.: PCT/FR03/00277

§ 371 (c)(1),
(2), (4) Date: Jul. 28, 2004

(87) PCT Pub. No.: WO03/065713

PCT Pub. Date: Aug. 7, 2003

(65) Prior Publication Data

US 2005/0158017 A1    Jul. 21, 2005

(30) Foreign Application Priority Data

Jan. 31, 2002    (FR)    .................................... 02 01567

(51) Int. Cl.
*H04N 5/91*    (2006.01)
*H04N 7/00*    (2006.01)
*H04N 7/26*    (2006.01)

(52) U.S. Cl. ............................ 386/95; 386/46; 386/111; 386/112

(58) Field of Classification Search .................... 386/95, 386/124, 46, 111–112
See application file for complete search history.

(56) References Cited

U.S. PATENT DOCUMENTS 4,605,961 A * 8/1986 Frederiksen ................ 380/215
4,685,131 A * 8/1987 Horne ........................ 380/241

(Continued)

FOREIGN PATENT DOCUMENTS

EP    1161087    12/2001

OTHER PUBLICATIONS

Search Report Dated Jun. 12, 2003.

*Primary Examiner*—Thai Tran
*Assistant Examiner*—Daquan Zhao
(74) *Attorney, Agent, or Firm*—Robert D. Shedd; Joseph J. Opalach

(57) ABSTRACT

A communication network performs a method of managing recordings. The communication network comprises a plurality of audiovisual terminals furnished with recording means. The method comprises determining the most adapted terminal among the plurality for recording a specific document. Values of fit are calculated from attributes associated with the document and attributes associated with each terminal. The terminal whose value of fit is the greatest is selected and used for recording this document. The morality of the document and the maximum level of morality accessible from the terminal being compared in order to barre the recording of the document in a terminal if the morality level of this document is higher than the morality level of this terminal.

14 Claims, 2 Drawing Sheets

U.S. PATENT DOCUMENTS

| | | | |
|---|---|---|---|
| 5,132,679 A * | 7/1992 | Kubo et al. | 340/825.22 |
| 5,402,115 A * | 3/1995 | Tanaka | 340/3.1 |
| 5,455,619 A * | 10/1995 | Truckenmiller et al. | 725/14 |
| 5,550,575 A * | 8/1996 | West et al. | 725/28 |
| 5,619,251 A * | 4/1997 | Kuroiwa et al. | 725/133 |
| 5,631,888 A * | 5/1997 | Itoh et al. | 369/47.12 |
| 5,663,756 A * | 9/1997 | Blahut et al. | 725/30 |
| 5,673,381 A * | 9/1997 | Huai et al. | 714/1 |
| 5,828,403 A * | 10/1998 | DeRodeff et al. | 725/131 |
| 5,883,621 A * | 3/1999 | Iwamura | 725/37 |
| 5,884,004 A * | 3/1999 | Sato et al. | 386/98 |
| 5,951,639 A * | 9/1999 | MacInnis | 725/70 |
| 6,091,686 A * | 7/2000 | Caffarelli et al. | 369/53.24 |
| 6,122,436 A * | 9/2000 | Okada et al. | 386/126 |
| 6,181,870 B1 * | 1/2001 | Okada et al. | 386/95 |
| 6,188,703 B1 * | 2/2001 | Dobson et al. | 370/537 |
| 6,226,241 B1 * | 5/2001 | D'Amato et al. | 369/47.15 |
| 6,285,826 B1 * | 9/2001 | Murase et al. | 386/125 |
| 6,286,142 B1 * | 9/2001 | Ehreth | 725/78 |
| 6,311,011 B1 * | 10/2001 | Kuroda | 386/46 |
| 6,311,178 B1 * | 10/2001 | Bi et al. | 707/3 |
| 6,366,933 B1 * | 4/2002 | Ball et al. | 715/511 |
| 6,429,879 B1 * | 8/2002 | Sturgeon et al. | 715/723 |
| 6,546,390 B1 * | 4/2003 | Pollack et al. | 707/7 |
| 6,636,953 B2 * | 10/2003 | Yuasa et al. | 711/161 |
| 6,646,825 B1 * | 11/2003 | Kaneda et al. | 360/78.05 |
| 6,757,478 B2 * | 6/2004 | Owashi et al. | 386/46 |
| 6,760,915 B2 * | 7/2004 | deCarmo | 725/28 |
| 6,920,281 B1 * | 7/2005 | Agnibotri et al. | 386/125 |
| 6,976,070 B1 * | 12/2005 | Hoashi et al. | 709/224 |
| 7,089,576 B1 * | 8/2006 | Lynch | 725/25 |
| 7,194,755 B1 * | 3/2007 | Nakata et al. | 725/78 |
| 7,260,480 B1 * | 8/2007 | Brown et al. | 702/19 |
| 2002/0002465 A1 * | 1/2002 | Maes | 704/275 |
| 2002/0006273 A1 * | 1/2002 | Seo et al. | 386/96 |
| 2002/0049635 A1 * | 4/2002 | Mai et al. | 705/14 |
| 2002/0059600 A1 * | 5/2002 | Matsumoto et al. | 725/40 |
| 2002/0150392 A1 * | 10/2002 | Yoo et al. | 386/111 |
| 2002/0186657 A1 * | 12/2002 | Jain et al. | 370/235 |
| 2003/0009567 A1 * | 1/2003 | Farouk | 709/229 |
| 2003/0053492 A1 * | 3/2003 | Matsunaga | 370/537 |
| 2003/0149988 A1 * | 8/2003 | Ellis et al. | 725/87 |
| 2003/0163593 A1 * | 8/2003 | Knightly | 709/251 |
| 2003/0175012 A1 * | 9/2003 | Okada et al. | 386/69 |
| 2004/0012510 A1 * | 1/2004 | Chen | 341/50 |
| 2005/0028208 A1 * | 2/2005 | Ellis et al. | 725/58 |

* cited by examiner

METHOD OF MANAGING THE RECORDING OF AUDIOVISUAL DOCUMENTS IN A TERMINAL SELECTED AMONG A PLURALITY OF TERMINALS, AND AN ASSOCIATED TERMINAL

This application claims the benefit, under 35 U.S.C. § 365 of International Application PCT/FR03100277, filed Jan. 30, 2003, which was published in accordance with PCT Article 21(2) on Aug. 7, 2003 in English and which claims the benefit of French patent application No. 9201567, filed Jan. 31, 2002.

FIELD OF THE INVENTION

The invention relates to a method of managing recordings of audiovisual documents within audiovisual terminals connected together by a digital communication network, and a recording device such as an audiovisual or audio terminal designed to implement the method.

BACKGROUND

A digital communication network comprises installations linked together by a communication bus, for example the IEEE 1394 bus, using wires or waves. The network of domestic type comprises, for example, the following installations: terminals allowing the users to store and reproduce audiovisual documents, terminals allowing the users to view audiovisual documents, digital television receivers (a decoder for example) capable of receiving audiovisual documents originating from a transmission network or from a point-to-point network (internet for example), a device for storing the audiovisual documents (a video recorder), a modem, etc. The list of the installations is not exhaustive. There may be several of each installation within the communication network, for example it is conceivable that, for a domestic communication network, each room of the residence has a terminal, that several receivers make it possible to receive documents originating from several transmission networks, and that the communication network has several storage devices of different type, for example a digital video recorder and a hard disk. The network can be managed in a centralized manner with the aid of a control installation or distributed, each installation having the possibility of controlling the network alternately.

The documents that may be recorded possess attributes which define their size, their type (audiovisual, audio, executable program, etc), their topic (film, documentary, news, advertisement, etc) and sometimes a subtopic for certain topics (in the case of a film: action, romance, adventure, horror, cast list, etc.).

The digital communication network allows the users and the applications to share resources within a residence. These resources may be classed according to the fact that they store information, or that they use stored information. The sharing of the resources poses problems relating to the transfers of information through the network and the occupancy of the available bandwidth.

Let us assume for example that a user invokes the viewing of a document recorded on a storage facility situated in another room, and that at this moment the network is overloaded, the user will not be able to see his audiovisual document correctly.

Patent Application EP1 161 087 describes the reception and the storage of an audiovisual document within appliances linked by a network. The storage appliance is determined as a function of data introduced by the user associating a certain type of audiovisual document with one or more appliances. However, this system requires the intervention of the user to program such associations, this necessitating manual operations.

The present invention allows better optimization of the storage space distributed between the various installations of a network, and improved usage of the bandwidth of the network by decreasing the number of data transfers. The present invention thus makes it possible to optimize the use of the recording devices connected in a network. Moreover, the present invention avoids the need for the user to indicate the storage appliance upon each receipt of a new document.

SUMMARY OF THE INVENTION

The present invention consists of a method of managing recordings of audio or audiovisual documents within a communication network comprising a plurality of audiovisual terminals furnished with recording means, characterized in that it comprises the following steps:

a) calculation of a value representing the fit concerning the recording between the document and a terminal;

b) repetition of step a) by calculating a value of fit for each terminal;

c) selection of the installation for recording the document whose value of fit is greatest.

In this way, the network searches for the installation most suitable for recording the document as a function of criteria associated with the document and of criteria associated with the installation. This fit avoids certain transfers since the document can be read directly from the installation, therefore globally it decreases the transfer times and optimizes resources. The criteria associated with the document are either transmitted with it or calculated dynamically at the terminal level.

According to an improvement, the calculation of the value of fit takes into account the topic of the audiovisual document and the topic of the documents generally selected by the users of the terminal. According to an improvement, the calculation of fit takes into account the type of document and prevents recording when the types are different. According to another improvement, the calculation of fit takes into account the size of the audiovisual document and the average size of the documents that are stored in the terminal, the installation in which the average size of the documents corresponds to that of the document is used in a privileged manner.

According to another improvement, the calculation of fit takes into account the size of the audiovisual document and the transfer data rate of the terminal, and the storage of the small files in the terminals which have a slow data rate is privileged. According to another improvement, the calculation of fit takes into account the morality of the audiovisual document and the maximum level of morality of the documents accessible from the terminal, the installation in which the maximum level of morality of the documents is less than that of the document to be recorded is used in a privileged manner.

According to another improvement, each terminal possesses a list of attributes constituting a type profile of the user for this terminal, the attributes of this list are the attributes of the documents generally ordered by users on this terminal and reproduced by this terminal. According to another improvement, this list is modifiable manually by a user of this terminal.

According to another improvement, when an installation is connected to the network, a transfer of at least one document is effected to this new installation when the values of fit for this new installation are better than those calculated for any other installation.

A subject of the invention is also an audiovisual terminal furnished with means for recording audio or audiovisual documents, characterized in that the terminal comprises a means for calculating a value representing the fit between a document to be recorded and the terminal, the recording means being activated or otherwise so as to record this document according to the value calculated.

BRIEF DESCRIPTION OF THE DRAWINGS

Other characteristics and advantages of the present invention will emerge from the description of the exemplary embodiments that will follow, taken by way of no limiting examples, with reference to the appended figures, in which.

DETAILED DESCRIPTION

Figure 1:
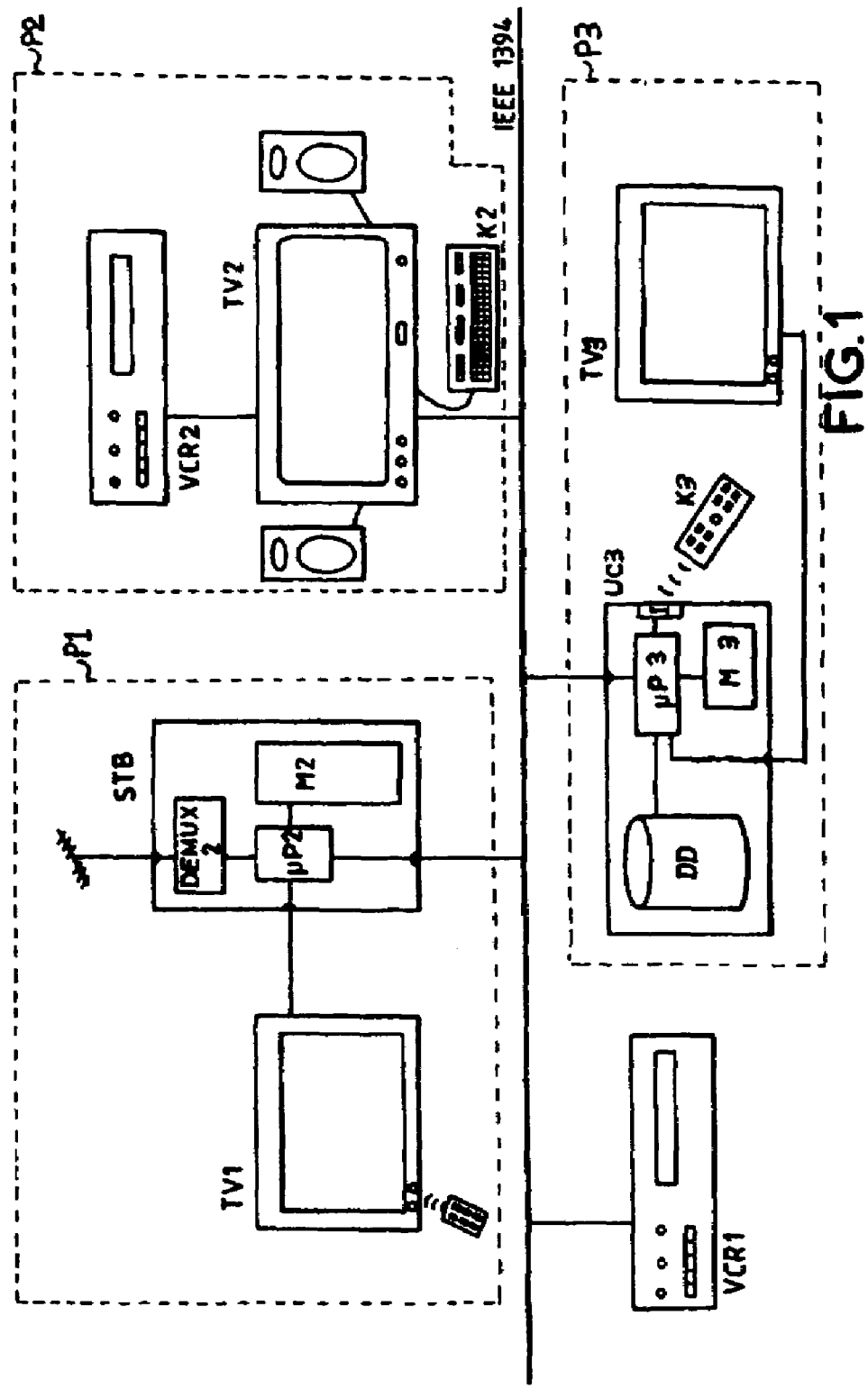
FIG. 1 represents a diagram of a domestic network in which the invention is implemented.

A digital communication network according to a present exemplary embodiment is described in FIG. 1. This network comprises for example the following installations:

- a decoder STB comprising a processing unit (µP2), a memory (M2) for storing audiovisual documents, a tuner and a demultiplexer DEMUX2 making it possible to receive documents sent over a transmission network, and a connection with a television screen TV1. This assembly is placed in a room P1 of the house, the kitchen for example.
- an interactive television screen TV2, furnished with an alphanumeric keypad K2, and connected to a video recorder VCR2, the whole being able to serve as terminal so as to introduce commands into the network. This assembly is placed in a room P2 of the house, the living room for example.
- an audiovisual system comprising a processing unit UC3, a program memory M3, and a hard disk of large capacity for storing audiovisual documents, or images. A central unit is also connected to a television screen TV3. This assembly is placed in a room P3 of the house, the parents' bedroom for example. A similar assembly can also be set up in the children's' bedroom.
- a video recorder accessible only through the network.
- A HIFI deck (not represented) comprising a processing unit, a hard disk for storing audio documents only (in MP3 file form for example), as well as a restitution unit making it possible to listen to the audio documents.
- A modem (not represented): allowing the network to access an external network, internet for example, through a telephone link.

All these installations are linked together by a digital bus using for example the IEEE 1394 standard.

The network also comprises a management system which constantly interrogates the various installations and can thus ascertain their state of availability. As we shall detail hereinafter, the system for managing requests for executing recordings determines which storage facility is responsible for receiving the recording. The determination of the choice of the installation is made as a function of various criteria dependent on the audiovisual document and/or on the storage installation. According to the mode of management of the network, the management system is not located at the same place. If management is distributed, it is located in the form of a program duplicated in each installation. Each installation is furnished with an identifier ID (for example, the "node ID" allocated by the manager of the IEEE 1394 bus). If the management of the network is of centralized type, the network manager is embodied as a central unit (for example the UC3) controlling the communications over the network and certain functions of the various installations. These functions are executed by dispatching orders.

The decoder STB receives digital data sent by a satellite. The digital content of these data is, for example, images in the MPEG format, constituting audiovisual documents. For example, the data received are formatted according to the DVB standard established by ETSI ("European Telecommunications Standards Institute") published in September 1997 under the reference EN300 468—V1.3.1 or under the reference REN/JTC-00DVB-43. The attributes of the documents are contained in service information. This service information is defined by the DVB-SI ("Digital Video Broadcast—specification for Service Information"). The service information may also originate from other sources, for example from a server accessible via the internet. The means for receiving the documents are: a tuner, a CD player, DVD, magnetic cartridge or quite simply a video recorder, a modem for connection with an external network. The documents are stored either in the hard disk of the decoder or with the aid of a digital video recorder in magnetic tape cassettes, or in high-capacity electronic memories, of FLASH type, for example. Once stored the documents are referenced as file identified by an identifier so that the network management system can find them easily. The files occupy a memory size according to their type: image (a few tens or hundreds of Kbytes per image), audio (mp3, a few Mbytes per file) or video (a few tens or hundreds of Mbytes per file). The data are then read from the recording device, forwarded via the digital network and viewed on television screens, or listened to with the aid of audio means.

The present invention makes it possible in particular to determine the storage facility as a function of various criteria that are or are not dependent on the document to be recorded such as:

Capacity of each storage facility.

Data rate of recording and of reading of the storage facilities.

Available size of each storage facility.

Average size of the documents stored in the storage facility.

Size of the document (that is to say: size of the file).

Type of the content of the document (image, audio, video, etc.)

Other attributes of the document (topic, morality, etc.)

User profile of the storage facility

This list is not limiting.

To assign a storage facility to each new document to be stored, the system must be continuously au fait with the state of the network, and with the installations of which it is composed. Next, the network manages a table associating the identifier of the document recorded with the location where it is recorded, that is to say the identifier of the storage facility, in such a way that a read request is addressed to the right facility. The updating of this table (as well as the sitting of the corresponding file) is:

static: the table is updated at each recording. Once a document has been stored at a place, it will no longer move, unless the user intervenes explicitly through direct manipulation.

or dynamic: the system searches for optimization continuously. It will move files so as to take account of the new data. It does this without disturbing the normal operation of the network.

The management system (be it centralized or distributed) defines according to a strategy that storage facility on which a document should be recorded. The strategy takes into account several aspects which each use one or more criteria listed above. These various aspects make it possible to optimize storage, the system selects the facility which satisfies the most possible aspects. The system can also decide that an aspect prevents storage in a given facility, regardless of the other aspects.

A first aspect consists in considering that the file should not be fragmented (or be so as little as possible). Let us assume for example that the user has two 100 Gbytes storage facilities on his network, the first being 80% full (i.e. 20 Gbytes free) and the second 90% full (i.e. 10 Gbytes free). When the system has to record a document 15 Gbytes in size, it will not fragment it into 10 Gbytes for the first facility and 5 Gbytes for the second. The system will decide to store a single block in the second facility which will then be 95% occupied. In this way, if one of the installations of the network develops a fault, effectively all the contents located therein are no longer available, but no content available on another installation is affected by this fault.

A second aspect consists in storing the documents as a function of the place where they will thereafter be used. According to this aspect, when setting up a new storage facility, the user indicates its sitting to the system by assigning an attribute such as: Kitchen, Lounge, Parents' bedroom, the child Georges' bedroom, the child Isabelle's bedroom, etc. A predefined list of attributes is associated with this identifier. For example, the lounge appliance makes it possible to view films, series, the news, etc while the appliance in Georges' bedroom shows cartoons and reproduces techno music. In this way, the system is taught the customary usage of each installation, and can deduce there from the installation where a new audiovisual document has most chance of being used. This subsequently makes it possible to avoid transfers and to occupy the bandwidth of the network. The use of a document depends on several factors. A first factor lies in the capacities of the storage facility. For example: if the network has a single HIFI deck furnished with a storage means, it is preferable to record all the files of audio type directly therein since it is certainly from this installation that such documents will be read. In this case, the system analyzes the "TYPE" attribute of the document and decides that such documents are stored in a privileged manner in installations that are designed to reproduce only documents of this type. A second factor relates to the topic of the document to be recorded: if this document relates to a video showing how to prepare a dish, by giving in particular a recipe, the system determines that the best place to store the document is the facility situated in the kitchen (on condition that it comprises a hard disk and a screen). A third factor consists in taking into account the morality attribute of the video document to be recorded. If, for example the user has assigned a level of morality to the installations of the network, certain documents have to be barred from recording since their morality levels are incompatible with that of certain storage facilities. For example, the system receives a document whose morality attribute indicates that it is not "for all ages", this document cannot be stored in the children' bedroom, but rather in the parents' bedroom. Access to the storage facility of the parents' bedroom must be controlled by a password. Once the document has been stored in this facility, the user, from where he is in the house, must present the password to be able to read this document.

A simple means for determining the place of storage consists in the system taking account of the user profile associated with each storage facility. If the user is for example accustomed to consulting cookery recipes from the kitchen television set, the user profile associated with this facility comprises the "gastronomy" attribute. When a document having this topic or a synonym as attribute, is forwarded to the domestic network so as to be stored therein, the network management system determines that the place of storage is the kitchen television set. In order to better calculate the value of fit between the attributes of a document and the storage criteria associated with an installation, the system uses a dictionary making it possible to determine the synonyms between several attributes and storage criteria. For example, the kitchen installation is associated with "gastronomy", the sense of which is close to the term "cookery recipe" which is an attribute of a document. The value of fit calculated is a maximum when the terms are identical and decreases as their senses diverge.

Another example: let us assume that the document is an audio file of the "techno" genre, the place of storage is the HIFI deck in the bedroom of the child who listens to this type of music most often. The user profile of the installation in this bedroom is closer to the topic of the document to be recorded than the user profile of the installation situated in the parents' bedroom (their tastes being presumed to be more "classical"). The management system can take account of other types of attributes: the producer of films or the authors of audio works, the cast of a film, etc. The user profile can also take account of the information regarding the authors of the document. For example, an audio document made by a performer who is very much in vogue at present such as "Britney Spears" is recorded in the HIFI deck of Isabelle's bedroom, on the other hand the system for managing the recordings chooses the HIFI deck of the parents to store a musical work by "Miles Davis".

By taking this second aspect into account it is possible to limit the transfers of files and hence to Make best use of the bandwidth of the network. In this way, the system can direct the documents which arrive automatically such as: emails, services, interactive applications, etc as a function of the most appropriate rooms. For example, an advertisement relating to a food product is recorded in the kitchen, and a promotion regarding the rental of a film is recorded in the audiovisual appliance of the lounge.

A third aspect consists in taking account of the transfer times (read or write) associated with the storage facilities, and the average size of the files stored inside them. These facilities have input output means which limit the information data rate to a greater or lesser extent. In general, it is advisable to store small files on slow storage facilities whereas big files can be stored on faster storage facilities. The data rate of the installation thus defined may alter over time, for example, a hard disk which is already occupied in reading files has its bandwidth limited so as to record a big file at the same time. On account of its slow data rate, it is preferable for it to record only small files that require less bandwidth.

Certain storage facilities possess management which favors the storage of small files. For example, these facilities contain elementary units of 1 Kbytes referenced by descriptors, this being the case for hard disks. If one wants to store a 10 Mbytes file, the management system will update 10000 descriptors, which will require a long processing time. On the other hand, if the storage facility is a video recorder, it suffices to manage the start and the end of the tape counter in order to locate the document perfectly. Another example: the facility contains elementary units of 1 Mbyte, in this case, the storage of a document of a few tens of kilobytes causes some space to be lost. These examples show that each storage facility possesses an attribute relating to the average size of the documents that can be stored therein. Three attribute values are defined: small document (up to 100 Kbytes), medium document (from 100 Kbytes to 10 Mbytes), big document (more than 10 Mbytes).

It should be noted that, despite appreciable scatter of the documents, they nevertheless remain accessible from any point of the house.

An improvement to the embodiment described consists in automatically deleting the documents (that is to say the files in the storage facilities) as soon as the remaining space is insufficient to store a new document. To do this, the system maintains a cue whereby the last access to each document can be date-stamped. If at the time of a recording, the remaining space becomes insufficient, then the system offers the user a list containing the documents to which accesses are furthest away in time, and offers to erase them. A variant consists in the system automatically erasing the document access to which is least recent, and begins again until the space thus freed is sufficient to store the document. Another variant consists in the network having an archiving unit (of large capacity, but with slow access, for example a magnetic cartridge reader). The system can automatically transfer the files to which accesses are the least recent into this archiving unit.

Figure 2:
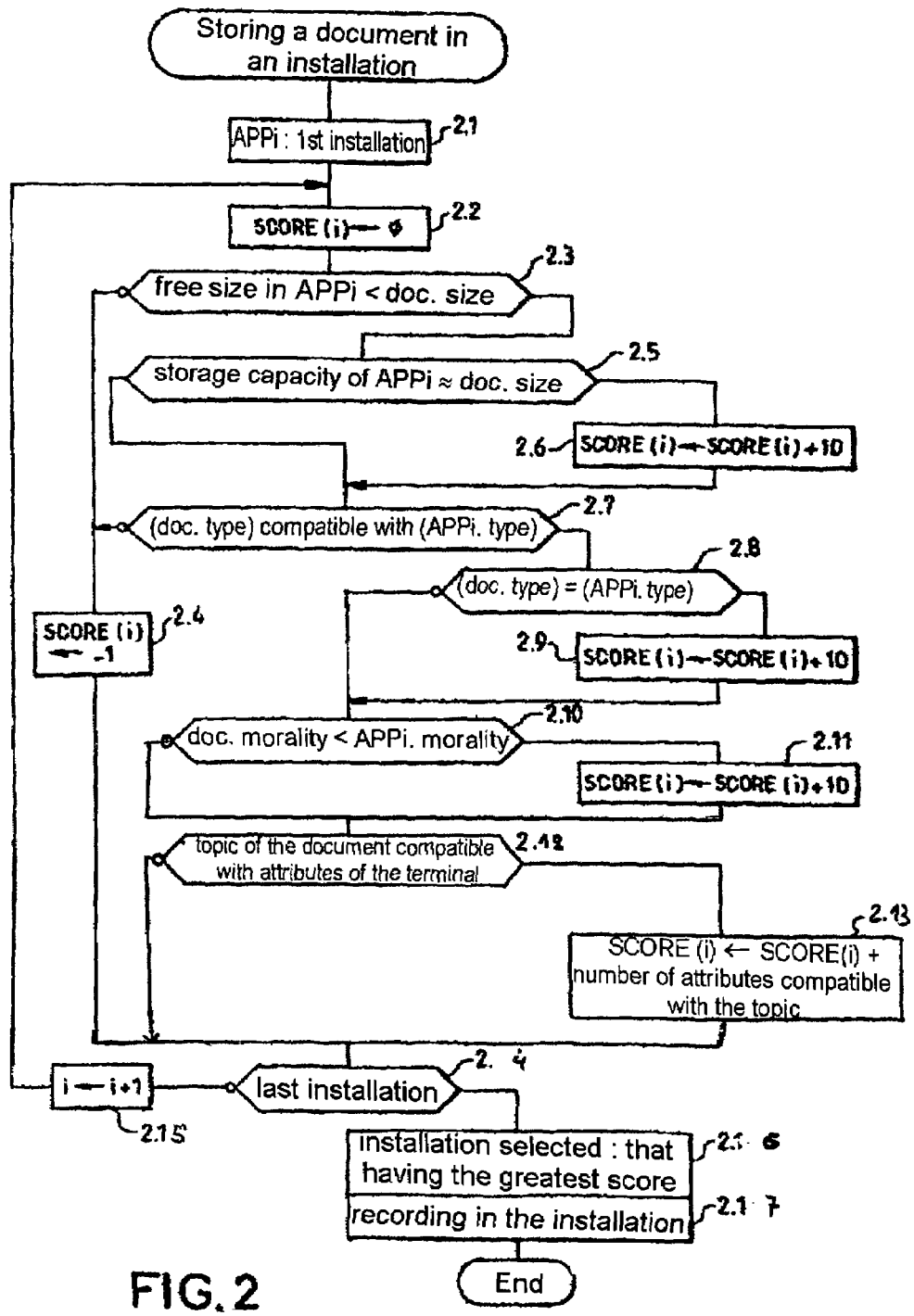
FIG. 2 represents a flowchart for the execution of the various steps of the method.

FIG. 2 shows a flowchart of the conduct of the method according to an exemplary embodiment. The example describes an embodiment with the aid of a HAVI type network, the system for managing the recordings being in the form of a program duplicated in the installations of the network which are furnished with a means of storage.

When a new document arrives over the network so as to be stored therein, the network management program is invoked. The "i" installations of the network are denoted APPi, each of the installations possesses a list of attributes such as its type (Type.APPi), its level of morality (morality.APPi) and its total storage capacity, the size of the memory that is still free, etc. In step 2.1, the program begins to analyze the first installation by assigning the value "1" to the variable i. To determine whether the document can be recorded in installation i, the program uses a table SCORE(i) whose values evaluate the fit between the installation APPi and the document. At the start SCORE(i) is set to 0 (step 2.2). Each value SCORE(i) constitutes a value of fit between the document and the terminal APPi.

The first test (step 2.3) consists in verifying that the document having regard to its size can be recorded in the installation APPi. If this is not the case, the program jumps to step 2.4 which assigns the negative value −1 to SCORE(i), this value reflecting the impossibility of storing this document in this installation. If the remaining size is sufficient, the second test (step 2.5) consists in evaluating whether the total storage capacity of installation APPi is compatible with the size of the document. This test evaluates whether the installation APPi that allows the storage of small or big recordings in a privileged manner is indeed that which is necessary according to the size of the document to be stored. If such is the case, the program adds in step 2.6 the value 10 to SCORE(i). Then the program goes to the third test (step 2.7) which verifies whether the type of the document is indeed compatible with the installation. If, for example, the document is audiovisual and if the storage facility can record audio only, recording will be impossible. If this is not compatible, the program jumps to step 2.4 which assigns the negative value −1 to SCORE(i) which signifies the impossibility of this document being stored in this storage facility. Otherwise in step 2.8, the program compares the types of the installation and that of the document, for example a VCR is designed to record an audiovisual document, the type of such an installation corresponds indeed to that of an audiovisual document. When the types are identical, the program jumps to step 2.9 and adds the value 10 to SCORE(i).

The fourth step (step 2.10) relates to that of morality, the program compares the morality index of the document with that of the installation i. The bigger the index, the narrower the public concerned. If the document is intended for users who can use this installation then, the program jumps to step 2.11, and adds the value 10 to SCORE(i). Accessibility should be in the broad sense, a user being able to access a storage facility remotely via the network.

The fifth test (step 2.12) makes it possible to evaluate the similarity between the document to be recorded and the attributes of the list of attributes recorded in the memory of the terminal. If the topic of the document is compatible with the attributes of the document then, in step 2.13, the program counts up the number of attributes whose sense is close to that of the words constituting the topic of the document. As many units are added to the value SCORE(i) as there are similarities between the words constituting the topic, and the words contained in the list of attributes of the terminal. For example, let us assume that the document relates to a recipe for cooking a Mexican dish, and that the list of attributes of the terminal APPi contains: {GASTRONOMY, MEXICO, ETC. . . . }, two units are added to the value of fit SCORE(i). According to an improvement, the addition of a unit can be endowed with a coefficient, 5, for example, in which case SCORE(i) is increased by 10.

The program reaches the end of the calculation of the value representing the fit between a document and a storage facility, the program thereafter determines whether other installations still remain to be evaluated (step 2.14). If such is the case, it jumps to step 2.15 which increments the index 1 and goes back to step 2.2 to sequence the various tests on the next installation. Otherwise, all the installations of the network possessing a means of storage have been evaluated; the one which is most appropriate for recording this document is the installation whose value SCORE(i) is highest (step 2.16). The program therefore scans the SCORE array, determines the highest value, deduces the index i there from and evokes, in step 2.17, the recording on installation APPi.

Annex 1 contains an example program written in pseudo-code for carrying out an exemplary embodiment.

Annex 2 contains an example program written in pseudo-code for carrying out another exemplary embodiment, more complete and more global.

The production of a user profile associated with each storage facility is carried out during a learning phase. This phase consists in storing the attributes of the documents stored directly by the users of each installation. As soon as a sufficient number of attributes is associated with an installation, the management system considers that it is associated with a user profile and will use the group of attributes as storage criteria. At any moment, each manual intervention by a user on an installation enriches the user profile of said installation.

It should be clearly noted in the present invention that the profile is associated with an installation regardless of its users. In fact, the management system formulates a type profile of the user associated with an installation. To gain time during the learning phase, or to tailor the user profile of the storage facility, it is possible to modify the data thus record and add (or erase) attributes. The term "document" also comprises interactive applications, for example a wake-up program is stored in the parents' bedroom in priority and possibly in the other bedrooms. A background music generator that can be adjusted is perfectly apt for the lounge since this is the most suitable place for its use.

Another improvement consists in taking into account the introduction of a new installation into the network. This installation is immediately detected by the system which reads off the characteristics thereof. If relevant, the system can automatically evoke transfers of documents for storage in the new installation, should the latter turn out to be more suitable than others already set up to use them. For example, the arrival of a new audiovisual assembly in the lounge, furnished with a HIFI deck but no screen, brings about the transfer of a certain part of the audio files into this new assembly. It is in fact probable that such documents are listened to in a privileged manner on the newly set up appliance.

The exemplary embodiments of the invention that were presented above were chosen for their concrete nature. It would, however, not be possible to exhaustively catalogue all the embodiments covered by this invention. In particular, any step or any means described may be replaced with an equivalent step or means without departing from the framework of the present invention.

---
ANNEX I
---

```
document Attributes = selectedDocument.getAttributes( )
    // attributes of the document to be stored
device List = getStorageDeviceList( )
    // list of storage installations available on the network
device = deviceList.FirstElement( )             //
first of the list
while (device) {                                //
while there are installations
        // Check if remaining capacity is sufficient
    if (documentAttributes.size > device.remainingCapacity )
    {
            score[device] = –1                  // this
installation cannot store the document:score = –1
    }
        // Check regarding the content size
    if (score[device] != –1) {
        if (documentAttributes.size is small &&
(device.capacity is small)) {
                score[device] = score[device] + 10
    // both of small size
        }
            if (documentAttributes.size is big &&
(device.capacity is big)) {
                score[device] = score[device] + 10
    // both of small size
        }
    }
        // Check regarding the content type
    if (score[device] != –1) {
            if (documentAttributes.type is not compatible with
device.type) {
                score[device] = –1              //
e.g.: store a video on an mp3 recorder
        }
            if (documentAttributes.type is audio && (device.
type is audio)) {
                score[device] = score[device] + 10
    // both of small size
        }
    }
        // Check regarding the content morality
    if (score[device] != –1) {
            if (documentAttributes.morality is compatible with
(device.userSelectedMorality)) {
                score[device] = score[device] + 10
    // both of small size
        }
```

---
-continued
---
---
ANNEX I
---

```
    }
        device = deviceList.NextElement
    }
    i = getIndexOfBiggestValue(score[ ])
    electedStorageDevice = deviceList.getElement(i)
        electedStorageDevice.Record(document)
            // make the recording
```

---
ANNEX II
---

```
// The process for a recording is the following
// ==================================
// Step 1: The user chooses the document
document = ....
// Step 2: The system tries to find the most appropriate
storage device
electedStorageDevice = chooseOptimalStorageDevice(document)
// Step 3: When optimal storage device has not been found,
then ask the user to choose
if (electedStorageDevice is null) {
    electedStorageDevice = ....... // asks for user choice
(manual)
}
// Step 4: and finally asks for recording
electedStorageDevice.Record(document)
// =============================================
// The process for the dynamic part is following
// =============================================
// For each device, check for each document if the current
device is the optimal one
// If not, then move the document to the optimal storage
device.
// This process runs forever.
while (true) {
    deviceList = network.getStorageDeviceList
    device = deviceList.FirstElement( )
    while (device) {
        documentList = device.getDocumentList( )
        document = documentList.FirstElement( )
        while (document) {
            // Look if current location is optimal
            optimalDevice =
chooseOptimalStorageDevice(document)
            if (optimalDevice is not optimalDevice) {
moveDocument(device.getDocument(document), optimalDevice)
            }
            document = documentList.NextElement( )
        }
        device = deviceList.NextElement
    }
}
// =============================================
// The following method allows to determine which
// is the optimal storage device to host the
// given document
// =============================================
function chooseOptimalStorageDevice(Document
selectedDocument)
{
    documentAttributes = selectedDocument.getAttributes( )
        // attributes of the document to be stored
    deviceList = network.getStorageDeviceList( )
            // list of the storage installations available
on the network
    device = deviceList.FirstElement( )
    // first of the list
    while (device) {                            //
while there are installations
            // Check if remaining capacity is sufficient
        if (documentAttributes.size >
device.remainingCapacity ) {
                score[device] = –1              //
```

-continued

ANNEX II

```
this installation cannot store the document: score = -1
            }
            // Check regarding the content size
            if (score[device] != -1) {
                // both are small size
                if (documentAttributes.size is small &&
(device.capacity is small)) {
                    score[device] = score[device] + 10
                }
                // both are big size
                if (documentAttributes.size is big &&
(device.capacity is big)) {
                    score[device] = score[device] + 10
                }
            }
            // Check regarding the content type
            if (score[device] != -1) {
                // e.g.: store a video on a mp3 recorder
                if (documentAttributes.type is not compatible
with device.type) {
                    score[device] = -1
                }
                // same type
                if (documentAttributes.type is same as
device.type)) {
                    score[device] = score[device] + 10
                }
            }
            // Check regarding the content morality
            if (score[device] != -1) {
                if (documentAttributes.morality is compatible
with (device.userSelectedMorality)) {
                    score[device] = score[device] + 10
                }
            }
            // Check regarding the genre
            if (score[device] != -1) {
                // e.g.: Movies are most viewed on the living
room tv
                if device.attributeIsTop10(Genre,
document.genre) {
                    score[device] = score[device] + 20
                }
            }
            // Check regarding the artist
            if (score[device] != -1) {
                // e.g.: Britney Spears is most used on the
kids hifi
                if device.attributeIsTop10(Artist,
document.artist) {
                    score[device] = score[device] + 30
                }
            }
            // Check for streaming vs downloading
            if (score[device] != -1) {
                // prefer use of high rate storage device for
download
                if (document is downloaded && device has
highDataRate) {
                    score[device] = score[device] + 15
                }
            }
            device = deviceList.NextElement
        }
        // and the winner is...
        i = getIndexOfBiggestValue(score[ ])
        if (i is valid) {
            // an optimal storage device has been found for the
given document
            return deviceList.getElement(i)
        } else {
            // no optimal storage device has been found for the
given document
            return null
        }
    }
}
// ======================================================
```

-continued

ANNEX II

```
// The following method implements a minimal user profile
on the current device
// It is called each time that a content has been
viewed/listened
// more than half of its duration (to be considered as a
valid selection, not a zapping)
// It is a simple model of user profile, establishing one
table per type of attribute
// and giving a score to each attribute value
// It assumes that we have infinite memory;=((
// ======================================================
function documentHasBeenConsulted(Document
selectedDocument)
{
    increment Type[selectedDocument.type]
    increment Genre[selectedDocument.genre]
    increment Morality[selectedDocument.morality]
    increment Artist[selectedDocument.artist]
}
// ======================================================
// The following method checks if the given attribute
// is well ranked on the device (in the 10% top consulted)
// e.g.: attributeIsTop10(Artist, Britney Spears)
//         will return true on the kid's hifi set
//     will return false on the kitchen TV
// ======================================================
function attributeIsTop10(DocumentAttributeType attType,
DocumentAttributeValue attValue)
{
    top10list = device.getTop10List(attType)
    if (attValue is in top10list) {
        return true
    { else {
        return false
    }
}
```

The invention claimed is:

1. A method of managing recordings of audio or audiovisual documents within a communication network comprising a plurality of audiovisual terminals furnished with recording means, the audiovisual documents to be recorded and the terminals being associated with attributes; the method comprising:

introducing by a user of a maximum level of morality accessible from a terminal, calculating a value of fit between the document and a terminal; the value of fit being calculated by comparing the attributes of the audiovisual document and the attributes associated with the audiovisual terminal, the value of fit being all the higher the greater the similarity between these attributes, the morality of the document and the maximum level of morality accessible from the terminal being compared; in order to bar the recording of the document in a terminal if the morality level of this document is higher than the morality level of this terminal repeating the step calculating by calculating a value of fit for each terminal liable to record it and taking into account the morality level;

selecting the terminal for recording the document whose value of fit is greatest; and recording of the document in the selected terminal.

2. The method of managing recordings as claimed in claim 1, wherein the step of calculating comprises a step of comparing between the topic of the audiovisual document and the topic of the documents customarily accessible on this terminal.

3. The method of managing recordings as claimed in claim 1, wherein the step of calculating comprises a step of comparing between the type of the audiovisual document such as audio audiovisual photo and the type or types of documents that are generally reproduced with the aid of the terminal.

4. The method of managing recordings as claimed in claim 1, wherein the step of calculating comprises a step of comparing between the size of the audiovisual document and an installation in which the average size of the documents is very different from that of the document not selected in step of selecting.

5. The method of managing recordings as claimed in claim 1, wherein the attributes compared in the step of calculating relates to the size of the audiovisual document and the transfer data rate of the terminal, and in the step of selecting the terminal, a terminal having a data rate greater than a determined value is selected in a privileged manner for the recording of an audiovisual document of small size.

6. The method of managing recordings as claimed in claim 1, wherein a list of attributes is associated with each terminal, the attributes of said list being the attributes of the documents generally ordered by users on this terminal and reproduced by this terminal.

7. The method of managing recordings as claimed in claim 6, wherein the attributes list associated with the terminal is modifiable by a user.

8. The method of managing recordings as claimed in claim 1, wherein, when a new terminal is introduced into the network, a transfer of at least one document is effected to this new terminal when the values of fit calculated in the step of calculating for this new terminal are better than those calculated for any other terminal.

9. The audiovisual terminal furnished with means for recording audio or audiovisual documents and connected to a communication network, the documents to be recorded being associated with attributes characterizing them, the terminals being associated with attributes relating to their characteristics and/or their uses; wherein the terminal comprises a means for introducing by a user of a maximum level of morality accessible from the terminal, a means for calculating a value representing the fit between a document to be recorded and the terminal, the value of fit being calculated by comparing the attributes of the audiovisual document and the attributes associated with the terminal, the value of fit being all the higher the greater the similarity between these attributes, the morality of the document and the maximum level of morality accessible from the terminal being compared in order to bar the recording of the document in the terminal if the morality level of this document is higher than the morality level of the terminal, the recording means being activated or otherwise so as to record this document according to the value calculated and if the morality level allows the recording in the terminal.

10. The audiovisual terminal as claimed in claim 9, wherein the means of comparison compares the size of the audiovisual document and the average size of the documents customarily stored in the terminal, the recording means being activated in a privileged manner if the size of the audiovisual document lies in an interval defining the minimum size and the maximum size of the documents that can be recorded in the terminal.

11. The audiovisual terminal as claimed in claim 9, wherein the means of comparison compares the size of the audiovisual document to be recorded and the transfer data rate of the terminal, the means of recording of an terminal having a data rate greater than a determined value being activated in a privileged manner if the size of the audiovisual document is less than a determined size value.

12. The audiovisual terminal as claimed in claim 9, wherein it comprises a memory comprising a list of attributes, the attributes of said list being the attributes of the documents generally ordered by users on this terminal and reproduced by this terminal.

13. The audiovisual terminal as claimed in claims 12, wherein it comprises a means of modification by a user of the list of attributes.

14. The audiovisual terminal as claimed in claim 9, wherein the means of calculation is activated automatically upon the introduction of a new terminal into the network, and in that it comprises a means for downloading a document to the new terminal when the value of fit calculated by the means of calculation for this document and this new terminal is higher than the values calculated for any other terminal.

* * * * *